W. P. COLEMAN.
Millstone Dress.
No. 15,868.
Patented Oct. 7, 1856.
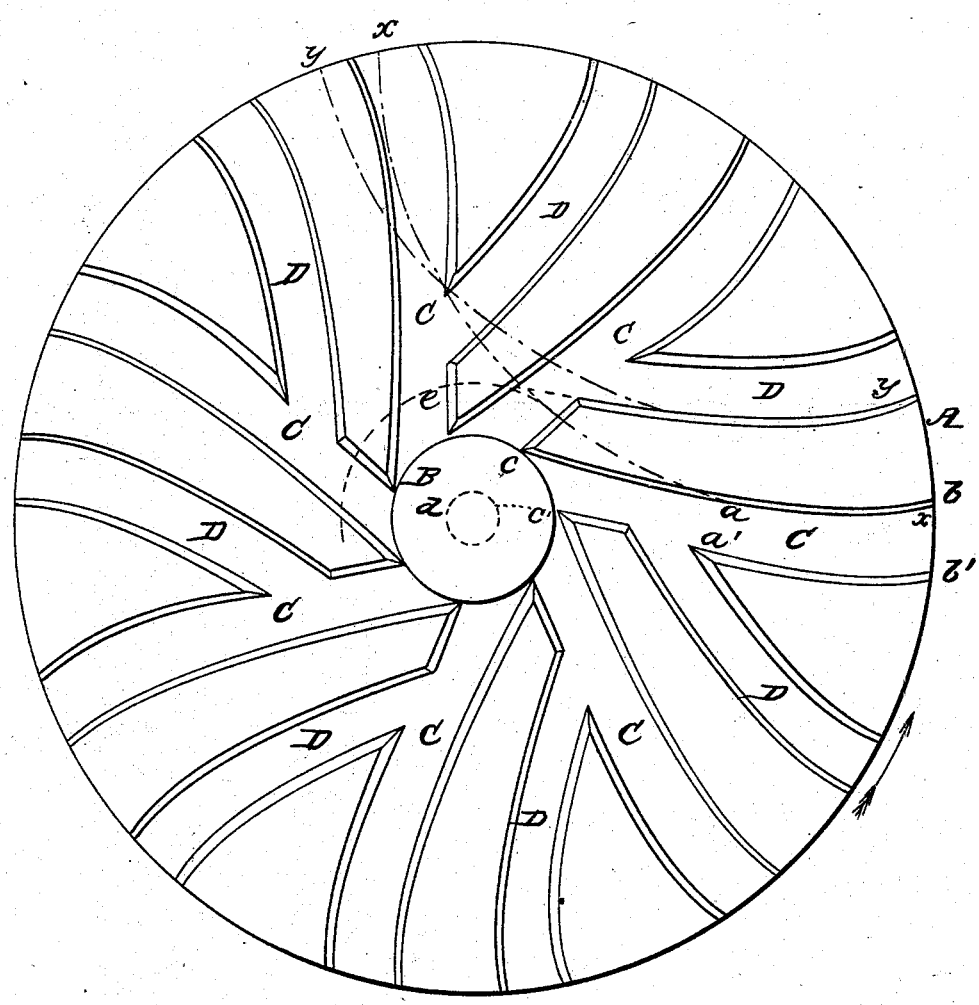

UNITED STATES PATENT OFFICE.

W. P. COLEMAN, OF NEW ORLEANS, LOUISIANA.

MILLSTONE-DRESS.

Specification of Letters Patent No. 15,868, dated October 7, 1856.

*To all whom it may concern:*

Be it known that I, W. P. COLEMAN, of New Orleans, in the parish of Orleans and State of Louisiana, have invented a new and Improved Dress for Millstones; and I do hereby declare that the following is a full, clear, and exact description of the same, reference being had to the annexed drawing, making a part of this specification, said drawing being a plan or face view of a millstone showing my improvement.

The nature of my invention consists in the peculiar form of the furrows which will be presently shown and described, whereby the grain is retained between the grinding surfaces of the stones a requisite length of time and the surfaces of the stones at all times, while the stones are in operation, supplied with a requisite quantity of grain, so that the surfaces of the two stones will not be in contact with each other.

In the annexed drawing A, represents a mill stone; B, is the eye of the stone.

C, represents the master furrows which extend from the eye B, to the periphery of the stone and D represents the subordinate or branch furrows which extend from the master furrows near the eye B, to the periphery of the stone.

The master furrows C, are each formed of tangents and curves. The tangents are drawn from the eye B, and an imaginary circle within the eye and the curves are segments of a circle, the diameter of which is equal to that of the stone A. The portion of the longest side of the master furrows between $(a)$ and $(b)$ are the curved portions and the red line $(x)$, $(x)$, shows that the curves are formed of a portion of a circle, the diameter of which is about equal to that of the stone A. The tangential portion of the longest sides of the master furrows from $(a)$ to $(c)$, are drawn from the edge of the eye B. The curved portions of the shorter sides of the master furrows between $(a')$, $(b')$ are about parallel with the curved portions of the opposite or longer sides, but as the furrows have a certain width the tangential portions between $(a')$, $(c')$ are drawn from an imaginary circle $(d)$ within the eye B, the tangential portions of both sides of the master furrows being parallel with each other. The curved portions of the longer sides of the subordinate furrows D, are also segments of a circle the diameter of which is about equal to that of the stone, see red curved line $(y)$, $(y)$ and the curved portion of the shorter and opposite sides are parallel with them. The straight portions of the longer sides of the furrows D, are drawn from an imaginary circle $(e)$ somewhat larger than the eye B.

The two stones, bed and runner, have the same dress when one stone is over the other, but the curves will be in opposite directions so that the cutting edges of the furrows of the two stones act similar to a pair of concave edged shears and the furrows of the runner are curved in a direction forward or in line with the plane of its motion, see arrow, so as to present a concave cutting surface to the grain.

By the above improvement the grain is moved quickly from the eye of the stone and is exposed to, or acted upon, by a large grinding surface as it passes to the periphery of the stones, the curved portion of the furrows prevent the grain from passing rapidly from between the stones because the direction given it by the curved furrows is opposite to the direction which the centrifugal force generated by the rotation of the runner would give it.

The within arrangement of dress is such that, as the substance to be ground recedes from the center to the periphery by the centrifugal action, the reverse curves act to retard the passage of the matter in about the ratio of the increase of grinding surface and also in about the ratio of increase of centrifugal action. The object of these combinations will be obvious.

The usual dress employed allows the grain to pass rapidly from the eye to the periphery of the stones and in consequence of this the grinding surfaces of the stones often are in contact, not only causing a loss of time as far as the grinding is concerned but also injuring or blunting the stones. With the usual dress therefore, the maximum grinding capacity of the stones is not obtained and the stones are injured in consequence of being in contact with each other. These difficulties or objections I have obviated by my improvement.

The dress arranged as above described will cause the stones to grind rapidly and well, as the eye of the stone is kept free and not liable to clog and the faces of the two stones are prevented from coming in contact with each other as the requisite quantity of grain is always between them while in operation, and consequently every portion of the grinding surfaces of the stones will be at work or in contact with the grain. A further advantage of the within arrangement is found in the fact that the grooves at the eye B may be made much deeper than usual as the retarding action of the reversed curves already referred to, will act to prevent the grain from being thrown out too soon from the curves already named and an additional advantage is obtained in consequence of the grain being distributed over a large area or extent of grinding surface thereby preventing the grain from being heated, as in consequence of the much greater depth of the furrows a much larger volume of air is admitted between the stones to keep the meal or flour cool.

I do not claim a circle dress or curved furrows the radii of which are equal to the radius of the stone or thereabout, nor yet the straight tangential furrows, of themselves or apart from their relative arrangement, combination and operation together in the two stones; neither do I claim, of itself, the curved furrows arching in opposite directions in the two stones and gathering in the grain toward the eye; but

I claim—

Forming the master and subordinate furrows C, D, of the stones, substantially as described, viz, the straight portions of the furrows being tangential with the eye and with circles concentric therewith, and the curved portions being segments of a circle of equal curvature or thereabout to that of the outer peripheries of the stones for the purpose of rapidly throwing the grain outward in the early action of the furrows and retarding or gathering it in by the after or outer portions thereof, as herein set forth.

W. P. COLEMAN.

Witnesses:
  Jos. Geo. Mason,
  Wm. Tusch.